United States Patent
Hanisko

[11] Patent Number: 6,124,788
[45] Date of Patent: Sep. 26, 2000

[54] SINGLE LAMP BRAKE STATUS INDICATOR SYSTEM

[76] Inventor: John-Cyril P. Hanisko, 21888 Murray Crescent, Southfield, Mich. 48076

[21] Appl. No.: 08/874,370

[22] Filed: Jun. 19, 1997

[51] Int. Cl.[7] ...................................................... B60Q 1/00
[52] U.S. Cl. ..................... 340/454; 340/453; 188/1.11 L; 188/1.11 E
[58] Field of Search ..................................... 340/454, 453, 340/455; 188/1.11 L, 1.11 E, 1.11 R; 73/129, 130

[56] References Cited

U.S. PATENT DOCUMENTS

| | | |
|---|---|---|
| 2,117,027 | 5/1938 | Langbein . |
| 3,456,236 | 7/1969 | Labartino et al. . |
| 3,594,721 | 7/1971 | Frenkel et al. . |
| 3,716,831 | 2/1973 | Rikard et al. . |
| 3,735,343 | 5/1973 | Lane et al. . |
| 3,755,774 | 8/1973 | Wilhelm . |
| 3,825,891 | 7/1974 | Kinast . |
| 3,869,695 | 3/1975 | Kita . |
| 3,872,425 | 3/1975 | Kobayashi ......................... 188/1.11 E |
| 3,902,157 | 8/1975 | Kita et al. . |
| 3,902,158 | 8/1975 | Dahlkvist . |
| 4,020,454 | 4/1977 | Malonee . |
| 4,074,226 | 2/1978 | Takeda et al. ....................... 188/1.11 E |
| 4,201,974 | 5/1980 | Fima ......................................... 340/454 |
| 4,204,190 | 5/1980 | Wiley et al. . |
| 4,298,857 | 11/1981 | Robins et al. . |
| 4,508,196 | 4/1985 | Jamon . |
| 4,562,421 | 12/1985 | Duffy . |
| 5,253,735 | 10/1993 | Larson et al. . |
| 5,302,940 | 4/1994 | Chen . |
| 5,358,075 | 10/1994 | Jarzombek . |
| 5,519,383 | 5/1996 | De La Rosa ............................ 340/455 |

*Primary Examiner*—Thomas J. Mullen, Jr.
*Assistant Examiner*—Anh La
*Attorney, Agent, or Firm*—Liniak, Berenato, Longacre & White

[57] ABSTRACT

A brake status indicating system including a plurality of serially connected brake sensors having a first illumination source and a second illumination source connected to a voltage source through a first resistance and a second resistance where both the first and second illumination sources are activated when the brake sensors are within a normal operating range and where both the first and second illumination sources are deactivated when any one of the brake sensors are outside of a normal operating range. The second illumination source remains deactivated if a brake wear sensor is shorted to ground and the first resistance limits the electrical current flowing through a wheel bearing.

12 Claims, 2 Drawing Sheets

| System Status | IS1 State | IS2 State |
|---|---|---|
| SS Closed WS Closed | On | On |
| SS Open WS Closed | Off | Off |
| SS Closed WS Open | Off | Off |
| WS Short to Ground | On | Off |

SINGLE LAMP BRAKE STATUS INDICATOR SYSTEM

BACKGROUND OF THE INVENTION

1. Field of the Invention

The present invention relates to an electronic circuit for indication of the operation status of a vehicle brake system. More specifically, the present invention relates to an electronic circuit for indication of the operational status of a vehicle brake system where first and second illumination sources are activated and deactivated to indicate the operational status of the braking system.

2. Description of the Prior Art

Prior art brake wear and adjustment systems connect each sensor to a condition electronics module to generate a signal to the driver or mechanic that brake service is required. Many systems have been developed in the past to provide a signal to a vehicle operator to warn that brake lining wear or actuator travel has progressed to a predetermined thickness. However, these systems have been generally unsatisfactory due to their complexity and/or unreliability.

U.S. Pat. Nos. 3,594,721; 3,716,831; 3,735,343; 3,755,774; 3,869,695 and 3,902,157 the disclosures of which are hereby incorporated by reference, disclose electronic signaling systems for the detection and notification of abnormal brake wear. One disadvantage with many of these systems is the parallel wiring configuration which results in a large number of conductors that must be used to connect the sensors with the electronic monitoring unit. Another disadvantage is that some prior art systems do not indicate when brake service is required if a short to ground fault occurs and in addition, provide a flow of electrical current through the wheel bearing which can result in a decreased bearing service life.

U.S. Pat. No. 3,456,236 discloses a brake shoe wear indicator system where the wear sensors are connected in series to a relay which, when de-energized, closes contacts to light a bulb in a trouble alarm circuit. This concept lacks the reliability required of a brake condition alarm system because it incorrectly indicates that the brake system is operational when the brakes are in fact worn out but the light is burned out or there exists an open circuit to the bulb. Thus, the condition of the brakes cannot be reliably ascertained using this type of prior art system.

SUMMARY OF THE INVENTION

The present invention provides an electronic circuit for activating and deactivating a first illumination source and a second illumination source to indicate when brake service is required. The opening of either a brake actuator travel limit switch or a brake shoe wear sensor causes both the first and second illumination sources to become deactivated thereby signaling the operator that service is required. If both the limit switch and the wear sensor are closed when the brake system is operational, then both the first and second illumination sources are activated. Any type and number of serially connected, normally closed sensors can be utilized with the present invention.

It is possible for some types of brake shoe wear sensors to ground out against the brake drum when the brake shoe wears to its service limit. Under this condition, when the brake is applied, the first illumination source will be activated but the second illumination source will become deactivated. When the brake is not applied, both the first and second illumination sources will remain deactivated signaling the need for service. In an alternate embodiment, a third illumination source is connected between the first and second illumination sources. Electrical power from the brake light circuit can be used to power the circuit which provides for added diagnostic features.

One provision of the present invention is to provide a brake electronic circuit for indicating when brake service is not required.

Another provision of the present invention is to provide a brake electronic circuit for deactivating first and second illumination sources when brake service is required.

Another provision of the present invention is to provide a brake electronic circuit for activating a first illumination source and deactivating a second illumination source when a wear sensor shorts to the brake drum upon application of the brake.

Still another provision of the present invention is to provide a brake electronic circuit that limits the level of electrical current flowing through a wheel bearing under the condition when a wear sensor shorts to ground through the brake drum.

DETAILED DESCRIPTION OF THE PREFERRED EMBODIMENT

Figures 1, 2:
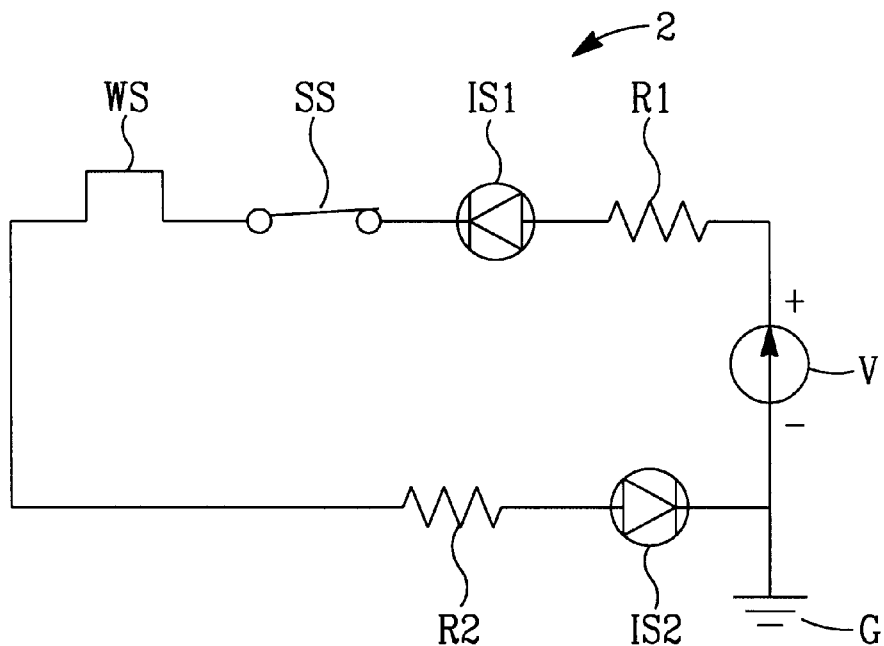
FIG. 1 is an electrical schematic diagram of the brake electronic circuit of the present invention.
FIG. 2 is a logic table showing the operational state of the illumination sources of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. 1 of the drawings, a circuit diagram of the brake status indicator system 2 of the present invention is shown. The brake wear sensor WS is of the type where a normally closed switch is adapted to open when the brake friction pad wears to its service limit and remains open until service. The wear sensor WS is electrically connected in series with a brake actuator travel sensor SS which is also a normally closed sensor that opens when the stroke of the brake actuator rod meets or exceeds a travel service limit. The stroke sensor SS is connected in series with a first illumination source IS1 which in the preferred embodiment is a light emitting diode (LED). The illumination source IS1 is connected in series with a resistor R1 which is connected to one side of a voltage source VS. The wear sensor WS is connected in series with a resistor R2 which is connected in series with a second illumination source IS2 which is connected to ground.

Resistors R1 and R2 serve to limit the current supplied to the illumination sources IS1 and IS2. Resistor R1 also functions to limit the current through the wheel bearing which rotatably supports the brake drum in the event that the brake drum shorts the wear sensor WS to ground when the brake is applied. Resistor R2 prevents illumination source IS2 from turning on in the event that the wear sensor WS has a shorting path through the brake drum when the brake is applied and significant series resistance is present. Using the circuit of the present invention, the level and duration of electrical current passing through the bearing supporting the brake drum is minimized. This feature is significant because electrical current passing through a bearing can create conditions leading to a decrease in service life.

Now referring to FIG. 2, a logic table for the brake status indicator system 2 of the present invention is shown. If the wear sensor WS and the stroke sensor SS are electrically closed (i.e. within normal operating range) then both illumination source IS1 and illumination source IS2 are activated. If the wear sensor WS and/or the stroke sensor SS are open (i.e. out of their service limit) then both illumination sources IS1 and IS2 are deactivated. If the stroke sensor SS is closed (i.e. brake actuator rod is within normal operating limits) and the wear sensor WS is shorted to ground usually due to the brake friction pad being worn past its service limit, then the first illumination source IS1 is activated and the second illumination source IS2 is deactivated.

It is possible to eliminate either the first illumination source IS1 from the circuit or the second illumination source IS2. If the first illumination source IS1 were eliminated, the second illumination source IS2 would be on only if both the wear sensor WS and stroke sensor SS were normal and closed. If the second illumination source IS2 is eliminated, then if the first illumination source IS1 is off, an opened wear sensor WS and/or stroke sensor SS must be present and service is required.

Figure 3:
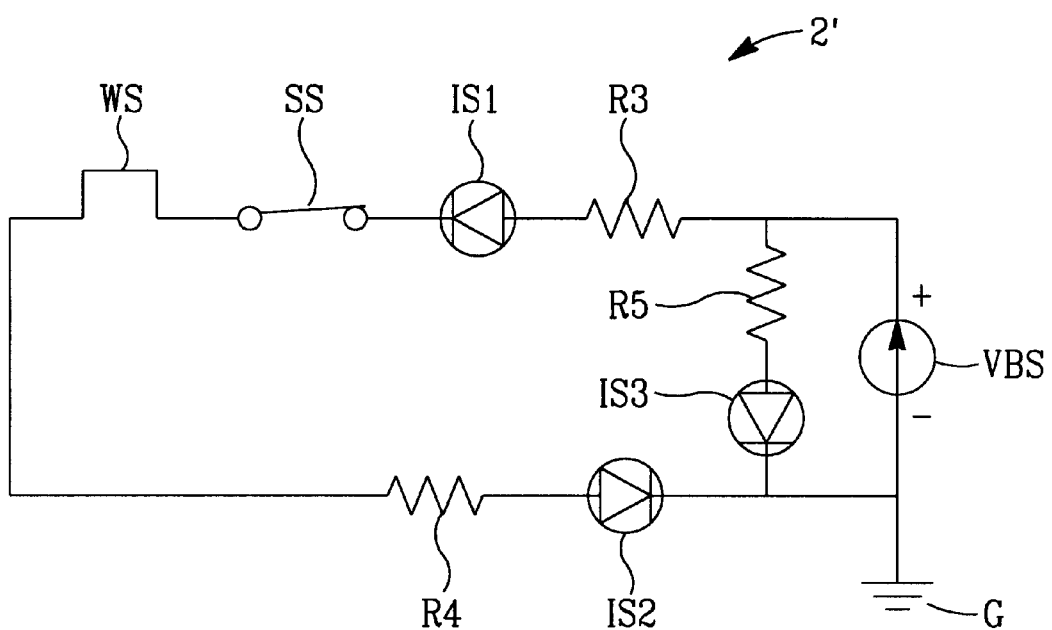
FIG. 3 is an alternate embodiment of the brake electronic circuit of the present invention.

FIG. 3 is an alternate embodiment of the electrical schematic diagram of the brake electronic circuit 2' of the present invention where a third illumination source IS3 (preferably an LED) and resistance R5 are connected across the voltage source VBS which is supplied by the vehicle brake light circuit. Thus, the circuit shown in FIG. 3 is only powered when the vehicle brakes are applied thereby providing electrical power to both the brake lights and the brake electronic circuit 2'. The third illumination source IS3 functions to signal to the operator when electrical power has been supplied to the brake electronic circuit 2' as the vehicle brakes are applied. Using the brake electronic circuit 2' as shown in FIG. 3, the operator can determine if the wear sensor WS is actually worn through and open even if the wear sensor WS appears closed due to contact with the brake drum thereby causing a short condition across the opened wear sensor WS. This determination can be made in air-powered braking systems due to the substantial increase in air pressure needed to move the brake shoe into contact with the brake drum as compared to that needed to initially activate the brake system. As the brakes are initially applied, the brake lights are energized and electrical power is supplied to the brake electronic circuit 2' as signaled to the operator by the activation of the third illumination source IS3. The operator then checks to determine if both the first illumination source IS1 and the second illumination source IS2 remain activated indicating that the wear sensor WS and the stroke sensor SS are within normal operating states. If the wear sensor WS is open, then both the first and second illumination sources IS1 and IS2 will be deactivated. As the driver/operator further activates the brakes, if the first illumination source IS1 becomes activated, then there is a short through the brake drum thereby electrically closing the wear sensor WS. In this manner, when, as shown in FIG. 3, the brake electronic circuit 2' is powered by the brake light voltage, the condition of the wear sensor WS can be ascertained even if the wear sensor WS is being shorted and closed by the brake drum.

Note that any number of wear sensors WS and/or stroke switches SS can be connected in series and to the brake electronic system 2 and 2' of the present invention.

Although this present invention has been described in its preferred form within a certain degree of particularity, it is understood that the present disclosure of the preferred embodiment has been made only by way of example, and that numerous changes in the detail construction in combination and arrangement of the elements may be resorted to without parting from the spirit and the scope of the invention as hereinafter claimed.

I claim:

1. A brake status indicating system comprising:

a normally closed brake pad wear sensor adapted to be in an electrically nonconductive open condition when a brake friction pad is worn to a friction pad service limit;

a normally closed brake actuator stroke limit switch adapted to be in an electrically nonconductive open condition when a stroke of a brake actuator rod reaches its actuator rod service limit:

a voltage source;

first resistance means connected to said voltage source;

a first illumination source connected to the limit switch and connected to said first resistance means;

second resistance means connected to the wear sensor; and a second illumination source connected to said second resistance means and connected to an electrical ground:

wherein said first and second illumination sources are energized when the normally closed wear sensor and the normally closed limit switch are electrically conducting and where said first and second illumination sources are nonenergized when at least one of the wear sensor and the limit switch is electrically nonconducting in said electrically nonconductive open condition.

2. The brake status indicating system of claim 1, wherein said first and second illumination sources are light emitting diodes.

3. The brake status indicating system of claim 1, wherein said first and second illumination sources are incandescent lights.

4. The brake status indicating system of claim 1, wherein the wear sensor and the limit switch are electrically connected in series.

5. The brake status indicating system of claim 1, further comprising a third illumination source connected across said voltage source.

6. The brake status indicating system of claim 5 further comprising a third resistance means connected in series with said third illumination source.

7. The brake status indicating system of claim 1, wherein when the stroke limit switch is in its normally closed electrically conductive condition and said brake pad wear sensor is in said electrically nonconductive open condition, said first illumination source is energized and said second illumination source is nonenergized.

8. The brake status indicating system of claim 5, wherein said third illumination source signals when electrical power has been supplied by the voltage source as said brake is applied.

9. A brake status indicating system for a brake comprising:

a plurality of sensors connected in series, each of said plurality of sensors is normally in an electrically closed condition and each of said plurality of sensors is adapted to be in an electrically open condition when a service limit is reached:

a source of electrical power;

first resistance means connected to said sources of electrical power;

a first illumination source connected to said plurality of sensors and connected to said first resistance means;

second resistance means connected to said plurality of sensors; and a second illumination source connected to said second resistance means and connected to said source of electrical power;

wherein said first and second illumination sources are energized when the normally closed sensors are electrically conductive and where said first and second illumination sources are nonenergized when at least one of the sensors is electrically nonconducting in said electrically open condition.

10. The brake status indicating system of claim 9 wherein said first and second illumination sources are light emitting diodes.

11. The brake status indicating system of claim 9 wherein the sensors are electrically connected in series.

12. The brake status indicating system of claim 9, further comprising a third illumination source connected across said voltage source and a third resistance means connected in series with said third illumination source, said third illumination source signalling when electrical power has been supplied by the voltage source as said brake is applied.

* * * * *